United States Patent
Day et al.

Patent Number: 5,413,713
Date of Patent: May 9, 1995

[54] METHOD FOR INCREASING THE RATE OF ANAEROBIC BIOREMEDIATION IN A BIOREACTOR

[76] Inventors: Donal F. Day, 2122 General Lee, Baton Rouge, La. 70810; Elton W. White, 19848 Creekround, Baton Rouge, La. 70816

[21] Appl. No.: 868,668

[22] Filed: Apr. 15, 1992

[51] Int. Cl.$^6$ ............................................. C02F 3/28
[52] U.S. Cl. ................................................. 210/617
[58] Field of Search ................. 210/616, 617, 618, 615

[56] References Cited

U.S. PATENT DOCUMENTS 4,627,917  12/1986  Morper ................................. 210/617

*Primary Examiner*—Ivars Cintins
*Attorney, Agent, or Firm*—William David Kiesel; Robert C. Tucker

[57] ABSTRACT

A process is disclosed to increase the anaerobic bioremediation rate in a bioreactor by recirculating to the bioreactor that portion of a pollution stream that has flowed through a passageway containing material on whose surface anaerobic microorganisms can attach or become immobilized at a flow rate that would slough from the surface and return to the stream at least a portion of the microorganisms from the surface. A preferred flow rate would be one which, after the surface of the material has been substantially covered with immobilized microorganisms, sloughs from the surface and returns to the stream a portion of the immobilized microorganisms at a rate of at least $10^5$ cfu for each milliliter of the stream flowing through the passageway, more preferably $10^6$–$10^8$ cfu. Another preferred flow rate would be one in which the total BOD consumed in the passageway per unit of time is maximized. Still another preferred flow rate would be 0.1–12.0 times the volume of the passageway per hour.

In another embodiment a microorganism incubation apparatus for bioremediation of a liquid pollution stream is provided which comprises: a column having a passageway extending through the column, charged, porous material positioned in the passageway and having a surface about which microorganisms can become immobilized, means for retaining the material in the passageway and structured to allow the stream to pass through the passageway, and a pump sized to flow the stream through the passageway at a flow rate sufficient to slough from the surface and return to the stream at least a portion of any microorganisms attached or immobilized on the surface of the material.

12 Claims, 6 Drawing Sheets

METHOD FOR INCREASING THE RATE OF ANAEROBIC BIOREMEDIATION IN A BIOREACTOR

BACKGROUND OF THE INVENTION

1. Field of the Invention

This invention relates in general to processes and apparatus for biologically treating a liquid pollution stream, and more particularly to processes and apparatus for increasing the bioremediation rate of a liquid pollution stream in a bioreactor.

2. Prior Art

It is common in various manufacturing processes to form as a by-product liquid streams which must then be disposed. These liquid streams will in many cases contain environmentally undesirable compounds, or pollutants. For example most organic compounds adversely effects the chemical oxygen demand (COD) levels of rivers, streams, lakes, ponds, harbors, oceans and/or underground water reservoirs. These organic compound levels are generally determined by measuring the biological oxygen demand (BOD) level which is a subset or component of the COD level. Such streams can not be discharged into rivers or other water reservoirs without first reducing or eliminating these pollutants in order to achieve environmentally acceptable COD or BOD levels.

Traditionally, processes used to treat various solid, liquid or gas pollution streams have been divided into four general categories: physical, chemical, biological, and thermal. Of these, biological treatment processes have been considered to potentially be the most attractive alternative to the other categories of treatment processes or at least as an attractive adjunct to the other categories of treatment processes. The primary reason being they detoxify and/or chemically degrade many pollutant streams to environmentally "safe" compounds; namely, carbon dioxide and water or methane, without the introduction or production of other pollutants into the environment. However, use has been limited in large part by their inefficiency, their high operating costs, and the limited known pollution streams which they can effectively treat.

These biological treatment processes are commonly referred to as bioremediation processes. Bioremediation encompasses all detoxifying or chemical degradation treatments of pollutants with aerobic and/or anaerobic microorganisms. It is common for a pollutant stream to exist which naturally contains many different microorganisms, either through adaptation, random mutation or the induction of degradative pathways, all of which may consume the pollutants as an energy or food source. This consumption by the microorganisms generally results in a natural detoxification and/or chemical degradation of the pollutants. Usually the number of such microorganisms increases in relation to the amount of pollutants present. Even when these microorganisms do not derive energy from a pollutant, they often will co-metabolize and degrade it along with another food source. This has been found to be the basis of some important degradative pathways for recalcitrant materials.

Bioremediation processes have generally been grouped into two broad areas: land treatment and liquid treatment. The liquid is commonly water. In land treatment, solids, sludge or liquid pollution are mixed into surface soils or composted. Although land treatment is one of the least expensive of the treatments it does require adequate amounts of land which many not be available. Land treatment processes are also now facing more stringent restrictions imposed by the Resource Conservation & Recovery Act (RCRA) and the Comprehensive Environmental Response, Compensation & Liability Act (known as "Superfund").

In water treatment processes, bioreactors are employed to increase the rate of biodegradation of pollution in liquid streams and can be a more rapid and efficient means of degrading pollution than any of the other treatment processes.

The term "bioreactor" as used herein includes any structure having a cavity that could hold a liquid pollution stream. This would include natural structures such as ponds, lakes, swamps, rivers, streams, harbors, and oceans, as well as man-made structures such as tanks, pipes and other storage vessels. It would also include onetime flow through digesters, such as onetime flow through activated sludge digesters, aeration basins, and ponds.

The simplest bioremediation processes entail pumping the liquid pollution stream into a bioreactor, generally a pond or holding tank, and letting the stream remain in the bioreactor until the desired bioremediation has naturally occurred. In most instances this process requires either a commercially unacceptable period of processing time or reactor size, or the desired level of bioremediation can not be obtained. Efforts to improve upon such natural bioreactors have been made. The most common of these is the injection of large amounts of air or oxygen into the bioreactor.

In bioremediation processes microorganisms are categorized into two major groups (aerobes and anaerobes) based upon their ability to use oxygen in energy generation. Aerobes have the ability to use oxygen in energy generation. Because of this ability the addition of oxygen or air to a bioreactor can rapidly increase the aerobic populations in the bioreactor. This increase in population will result in an increased rate of remediation of pollutants consumed by aerobes in the bioreactor. Unfortunately, these greatly increased populations of aerobes become sludge. The greater the population the more sludge that will be formed which because of its composition contributes to COD and BOD levels in the bioreactor mostly transforming soluble COD and BOD to solid COD and BOD. For this reason they must be removed prior to discharge of the treated stream into the environment. This removed sludge then has to be dried and stored in landfills or recycled into fertilizer, compost, etc. Another problem is that aerobic remediation of the stream is limited by the amounts of oxygen that can be added to the bioreactor. In conventional aeration systems the aerobes will consume 25 to 30 pounds of BOD related compounds per day per horsepower used in aerating the bioreactor. In more effective, but more expensive, diffused injection systems, this consumption rate can be increased to 75 to 150 pounds of BOD related compounds per day per horsepower. The significant capital cost associated with the equipment necessary to provide the aeration, as well as the continuous energy consumption and equipment maintenance cost associated with operating the aeration equipment are highly undesirable features of such systems. The magnitude of these costs can be seen when one considers that for a typical pulp and paper mill the resulting processing water stream requires the daily treatment of 16.6 million gallons to eliminate 100,000 pounds of BOD related compounds. To achieve this amount of consumption by aerobes, 3,000 to 6,000 horse power is utilized in conventional aeration systems. This will require annually 19–39 million kilowatts of electricity. At present day energy costs this would be approximately $75,000–$200,000 per month. This does not include the maintenance and chemical costs associated with the operation of this system. Such cost may run an additional $70,000 per month.

Anaerobes, unlike aerobes, are generally unable to use oxygen in energy generation and in fact are harmed by oxygen rich environments. Holding ponds, lagoons, and any other bodies of water with reduced dissolved oxygen levels are examples of bioreactors which utilize anaerobic bioremediation processes. However, it has been difficult to achieve significant increases in anaerobic populations. Therefore, even though it is known that anaerobic bioremediation processes produce considerably less sludge than aerobic processes, anaerobic bioremediation processes generally have been considered to be less efficient than aerobic bioremediation processes. In some bioremediation processes nutrients, trace elements and sometimes ex-situ grown microorganisms have been added to the biodigester. It is possible to isolate and purify pollutant specific microbes and reproduce these in relatively small numbers in fermentation units (ex-situ grown organisms). After careful analysis of the pollution and many treatability studies, mixes of the fermented microbes are blended and added to bioreactors to increase the rate and effectiveness of the bioremediation process. Often this treatment process requires the repeated introduction of the microorganisms in relative large quantities on a daily basis for extended periods of time. Both the isolation, purification, fermentation and introductions are expensive and many times are less than effective. Improvements are needed in finding, isolating and determining the mix of microbes best suited for the then ambient bioreactor environment and in recognizing when the mix needs to change to respond to bioreactor environmental changes.

Other pollution treatment processes have been designed to make use of both aerobes and anaerobes for treatment of pollution streams. In such dual treatment processes it is common, because of efficiency and economic reasons (sludge reduction and less BOD load on the aerobic system), to first anaerobically treat the pollution stream under anaerobic remediation process conditions before aerobically treating it under aerobic remediation process conditions. An anaerobic holding area is arranged upstream of the aerobic holding area. In those cases where the bioreactor is a deep pond the upper section may be capable of acting as the aerobic holding area and the lower section because of substantially reduced oxygen content may be capable of acting as the anaerobic holding area. Even though the anaerobic treatment is usually less rapid it does not produce the quantities of sludge aerobic systems produce and the desired amount of BOD removal can be accomplished by simply keeping the pollution stream in the bioreactor long enough for the desired reduction to occur. Such anaerobic treatment generally removes a significant quantity of the undesirable material from the pollution stream, thus resulting in less volume of pollution to be aerobically treated and thus reducing the overall cost of treatment. This is a desirable treatment strategy whenever enough storage area is available to achieve the necessary retention times.

Other recent effects to improve the rate of anaerobic remediation processes have been developed which utilize secondary treatment bioreactors. These are commonly referred to as anaerobic digesters or activated sludge anaerobic digesters. These digesters generally consist of containers filled with rocks, activated sludge, plastic beads or plant matter such as bagasse or reeds. The purpose of this fill material is to provide sites at which the anaerobic microorganisms may become attached or immobilized, but which still allows the pollutant stream passing through the digester to contact the attached or immobilized anaerobic microorganisms.

In these anaerobic bioreactor/digester processes the pollution stream is retained in the digester for the time needed to achieve a desired BOD reduction in the stream and then discharged either directly into the environment, or more commonly to an aerobic treating area where the anaerobically treated pollution stream is contacted with selected aerobic microorganisms under aerobic remediation process conditions until the desired additional BOD reduction in the stream is achieved. In this latter embodiment the anaerobic bioreactor/digester process acts as a modified form of the dual treatment processes described above.

Another problem associated with current bioreactor designs is that microorganisms tend to wash out of the bioreactors. As the microorganisms leave the bioreactor the rate of bioremediation, and therefore its effectiveness, is generally reduced.

Still another problem associated with remediation processes employing bioreactors is their sensitivity to environmental conditions within the pollution stream being introduced to the bioreactor or to environmental changes within the bioreactor. Rapid changes in the environment or the pollution stream are likely to destroy or greatly reduce (upset) the degradation efficiency of most, if not all, of the microorganisms in a bioreactor. It is known that microorganisms hibernate or slow down when the usually narrow environment for which they are acclimated is not present. However, microorganisms have proven extremely adaptable over time and many consortiums have evolved for most every biodegradable compound and environment. For example, temperature decreases cause microorganisms that were active at the higher temperatures to decrease or stop their activity and microorganisms better adapted to the new temperature to become active. Unfortunately, this deactivating and activating of microorganisms can be very slow, sometimes taking upwards of six months.

In addition to temperature changes other examples of environmental changes that can cause these upset conditions include pH and oxygen level of the stream, or introduction of poisons or biocides to the stream, and/or concentration or mix changes of the pollutants. Present known efforts have not been able to satisfactorily overcome these problems.

OBJECTS AND SUMMARY OF THE INVENTION

Therefore, one object of this invention is to provide improved processes for rapidly increasing the rate of remediation of bioreactors by the continuous addition of large quantities of the most pollution-specific and acclimated anaerobic microorganisms available to the bioreactor.

Another object of this invention is to provide improved processes and apparatus for continuous rapid selection (isolation) of the most pollutant-degrading and environment acclimated populations of anaerobic microorganisms available to the bioreactor.

Another object of this invention is to provide improved processes and apparatus for the continuous, rapid and automatic re-selection of the most pollutant-degrading and environment acclimated populations of anaerobic microorganisms whenever a more efficient organism becomes available in the bioreactor, either through the evolutionary process (adaption), from changing environmental conditions that favor one microbe over another or from ex-situ introduction of organisms into the bioreactor.

Another object of this invention is to provide improved processes and apparatus for continuously and rapidly increasing populations of the selected pollutant-degrading and environment acclimated microorganisms.

Another object of this invention is to provide improved processes and apparatus for continuously and rapidly adding the increased populations of the selected pollutant-degrading and environment acclimated microorganisms to a bioreactor.

Still another object of this invention is to provide improved processes and apparatus to protect a bioreactor from upsets.

Still another object of this invention is to provide improved processes and apparatus to provide rapid recovery of a bioreactor from upset conditions.

A further object of this invention is to provide an anaerobic incubator apparatus that is structured to accommodate various sized and shaped pollution water streams.

Another object of this invention is to provide processes and apparatus that do not require the addition of ex-situ grown microorganisms to the bioreactor.

A further object of this invention is to provide processes and apparatus that increase the pounds of BOD consumed per day per horsepower needed to power the bioreactor systems.

A further object of this invention is to reduce and eliminate the need to isolate, store and ex-situ reproduce microorganisms for introduction to bioreactors.

A further object of this invention is to reduce and eliminate the need for effectiveness (treatability) experimentation of mix selections prior to introduction of the microorganisms to the bioreactor.

Other objects and advantages of the invention will become apparent from the ensuing descriptions of the invention.

Accordingly, a process is disclosed for the bioremediation of a liquid pollution stream in a bioreactor wherein the anaerobic remediation rate of the bioreactor is increased by recirculating to the bioreactor that portion of the stream that has flowed through a passageway having a dissolved oxygen level sufficiently reduced to support anaerobes and containing material on whose surface anaerobic microorganisms can adhere or become immobilized at a flow rate that would slough from the surface and return to the bioreactor a portion of the microorganisms from the surface. A preferred flow rate would be one which, after the surface of the material has been substantially covered with immobilized microorganisms, sloughs from the surface and returns to the stream a portion of the immobilized microorganisms at a rate of at least $10^5$ cfu for each milliliter of the stream flowing through the passageway, more preferably $10^6$–$10^8$ cfu. Another preferred flow rate would be one in which the total BOD consumed in the passageway per unit of time is maximized. Still another preferred flow rate would be 0.1–12.0 times the volume of the passageway per hour.

In another embodiment a microorganism incubation apparatus for bioremediation of a liquid pollution stream in a reactor is provided which comprises a column having a passageway extending through the column, charged porous material positioned in the passageway, means for retaining the material in the passageway and structured to allow the stream to pass through the passageway, and a pump sized to flow the stream through the passageway at a rate sufficient to slough from the surface and return to the bioreactor at least a portion of any immobilized microorganisms.

PREFERRED EMBODIMENTS OF THE INVENTION

Figure 1A:
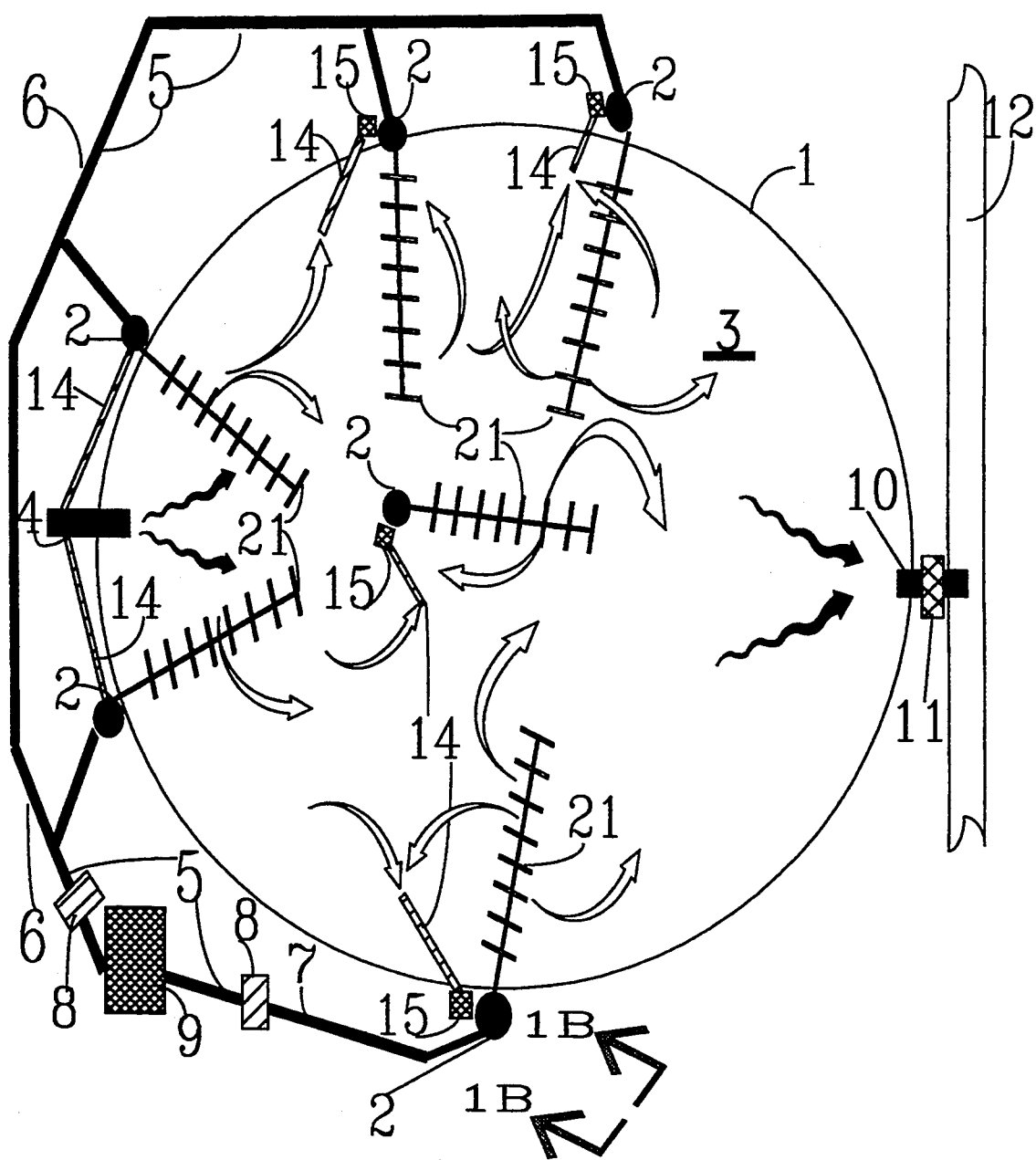
FIG. 1A is a schematic top view of an open bioremediation system having a pond biodigester and a collection of anaerobic incubator columns of this invention operatively connected to provide an anaerobic bioremediation process in accordance with this invention.
Figure 1B:
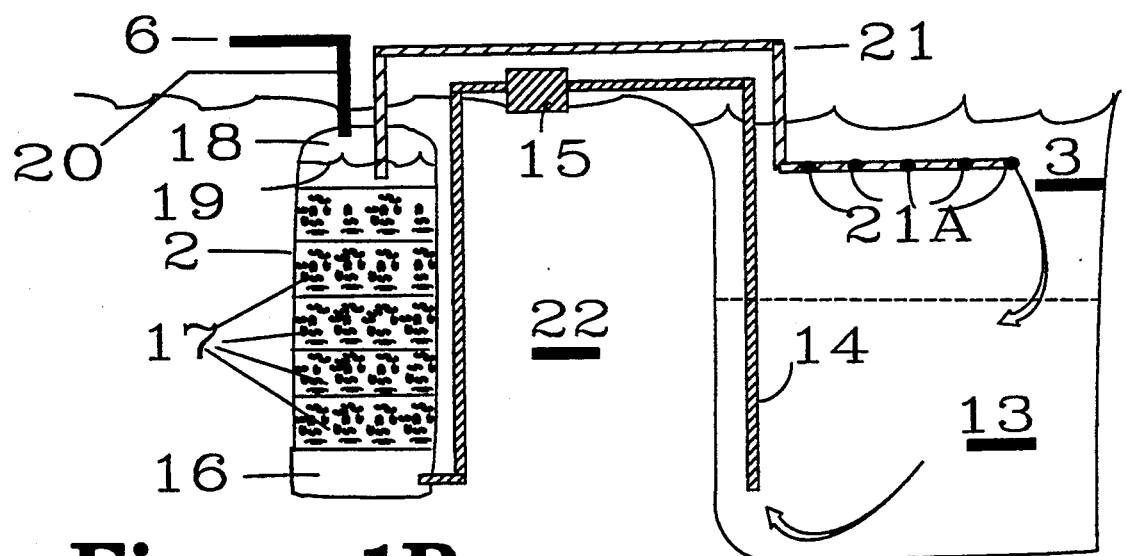
FIG. 1B is a schematic side view taken along lines I—I of FIG. 1A illustrating a preferred embodiments of the anaerobic incubator column of this invention.

The preferred embodiments will be described utilizing both an open and a closed bioremediation system. FIGS. 1A and 1B illustrate one such open bioremediation system. In this particular system a man-made pond 1 is utilized as the bioreactor. However, this system would work equally well for almost any bioreactor used in an open bioremediation system. Operatively connected to pond 1 are six anaerobic incubator columns 2 positioned strategically about pond 1 to more effectively and efficiently treat the liquid pollutant containing stream 3 which is introduced into pond 1 by discharge pipe 4. The other end of discharge pipe 4 is operatively connected to receive the liquid pollutant stream produced by the manufacturing or processing facility (not shown). Also included in the system is a gas gathering assembly 5 shown as two series of gathering pipe assemblies 6 and 7 which are operatively attached to incubator columns 2 to receive any gas, such as methane, which may be produced in the incubator columns 2. Each gathering pipe assembly 6 and 7 is provided with various flow control valves 8 and pumps 9 to assist in transporting the gathered gas to a gas separation and collection facility (not shown) where the gas by-products can be used as a fuel source, sold or flared.

The actual number, size and position of each incubator column 2 will depend on a variety of factors such as the nature of the pollutants being treated, the type of bioreactor used, the configuration of the bioreactor, the size of the bioreactor and the size of the incubator columns.

Also utilized in the system is a clarified stream discharge assembly comprising transfer pipe 10 and transfer pump 11. One end of transfer pipe 10 will be positioned in a section of pond 2 that will contain that part of the liquid pollutant containing stream 3 that has been bioremediated to the desired level. Pump 11 will assist in pumping the treated stream through transfer pipe 10 where it will be discharged from the opposite end of transfer pipe 10 into a river 12 or similar body of water.

In FIG. 1B the liquid pollutant containing stream from a lower section 13 of the pond 1 is drawn up through intake pipe 14 with the assistance of pump 15. From there it is introduced into the lower section 16 of the anaerobic incubator column 2. Anaerobic incubator column 2 contains small particle material 17 that serve as attachment or immobilization sites for the anaerobes that will be used to treat the liquid pollutant stream 3.

As additional amounts of the liquid pollutant stream 3 are pumped into anaerobic incubator column 2, the stream 3 will flow through material 17 at a rate that will make available sufficient amounts of pollutants to allow more anaerobes to be reproduced than there are available attachment or immobilization sites on material 17. These anaerobes are referred to as colony forming units (cfu). Since most anaerobes will reproduce on an average every twenty minutes if sufficient nutrients are available, the number of cfu's can be maintained at high levels. It is also noted that those anaerobes which best consume the pollutants in stream 3 will also be the anaerobes that reproduce in greater number. The maximum anaerobe population density naturally occurring in liquid seldom exceeds $10^8$ cfu/ml. On the other hand an attached or immobilized anaerobe population density can be as much as four logs higher ($10^{12}$ cfu/mm$^2$ on material surface). For this reason it is preferable that material 17 be sized to maximize the number of sites to which the anaerobes can attach or become immobilized.

It is preferred that the materials have the largest number of sites that will allow a flow rate sufficient to provide nutrients excessive to the energy requirements of an anaerobic population density of at least $10^{10}$–$10^{12}$ cfu/mm$^2$, most preferably about $10^{12}$ cfu/mm$^2$. Preferred examples of the surface material include activated carbons, clays, ceramics and other similarly constituted, preferably porous materials. It is also preferred that material 17 have either a positive or negative charge. It is more preferred that the charge be opposite any charge of the stream in order to facilitate the attachment or immobilization of the anaerobes about the surface of material 17. A particularly preferred material is activated carbon of 4×10 mesh size.

The flow rate will also be such to allow the excess anaerobes produced to slough from the sites and be carried downstream where they will eventually be returned to pond 3. Once the anaerobe population density attached or immobilized about the surface area of material 17 reaches $10^8$ cfu/mm$^2$, it is preferred that the flow rate be sufficient to permit the sloughing into stream 3 of at least $10^5$ cfu/ml of stream flowing through anaerobic incubator column 2, and most preferably, $10^6$–$10^8$ cfu/ml of stream flowing through anaerobic incubator column 2.

For a particular incubator column this flow rate can vary depending on the geometry of the incubator column, the charged site surface used, the total site surface area, the porosity of the site surface material selected, the depth and volume of the site surface material, the particular anaerobic microorganisms being incubated in the incubator column, the makeup of the pollution stream, as well as its COD or BOD levels. The higher the COD or BOD levels the slower the flow rate must be to achieve the same nutrient concentration within the surface material. A flow rate between 0.1–12.0 times the material volume in the incubator column per hour is preferred.

It is also preferred that the flow rate be sufficient to carry out of anaerobic incubator column 2 any excrement or sludge formed during the reproduction activity of the anaerobes.

For the sized and shaped reactor utilized in Experimental Test I and II, the preferred flow rate was 0.2 to 0.5 gpm per cubic foot of 4×10 mesh size activated carbon (or 1.1 to 4 material volumes per hour).

Methane and other gases may be formed during the anaerobes consumption of the pollutants and their reproduction. These gases, along with the sloughed anaerobes and partially treated pollutant stream enter into cavity 18 wherein the gases gather and are prevented from entering pipe 20 by water level 19. The gases are then drawn into pipe 20 where they enter the gas gathering pipe 6. The degassed mixture of sloughed anaerobes and partially treated pollutant stream exit cavity 18 through recirculation pipe 21 where they are discharged through hole 21A into an area of pond 1 some distance from intake pipe 104. In this manner the anaerobe population density in pond 1 is increased. Not only is the population density increased, but it is being continually increased with those anaerobes which best consume the pollutants in stream 3. By selectively positioning intake pipe 14 and recirculation pipe 21 the flow of stream 3 in pond 1 can be controlled (shown by arrows in FIG. 1A) to insure that stream 3 is sufficiently treated before being discharged into river 12.

In FIGS. 1A and 1B anaerobic incubator column 2 has been fully buried in the ground 22. The insulation afforded by ground 22 will maintain a relatively constant temperature inside incubator column 2 as a result of the insulation afforded by the ground 22. This temperature stabilization will assist in minimizing the effect of any temperature changes that may occur in the environment or in the pond 1. Although not illustrated, the anaerobic incubator column 1 could be placed in the pond itself, preferably in section 13.

Figure 1C:
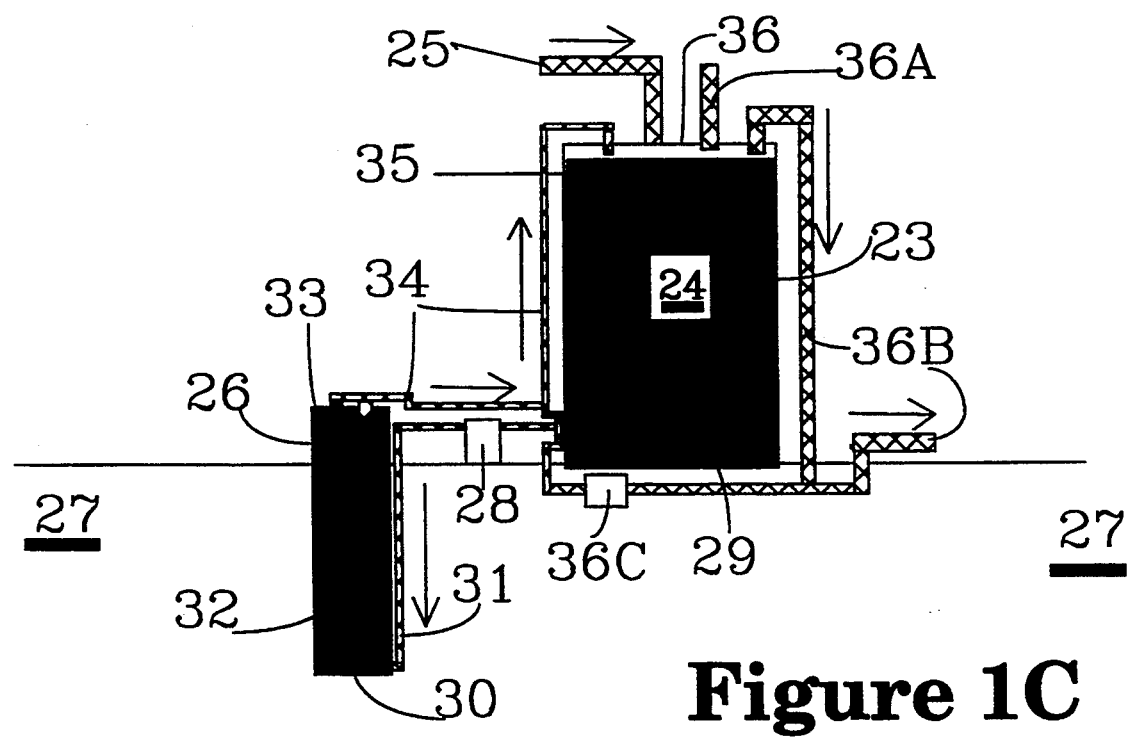
FIG. 1C is a schematic side view of a closed bioremediation system having a tank biodigester and a single anaerobic incubator column of this invention operatively connected to provide an anaerobic bioremediation process in accordance with this invention and is the type used in Experimental Test II.

The second configuration shown in FIG. 1C is a closed bioremediation treatment system. This system utilizes a closed tank 23 having a reservoir cavity 24 into which a liquid pollution stream has been introduced through inlet pipe 25. In this configuration anaerobic incubator column 26 has been partially buried in the ground 27 in order to maintain a relatively constant temperature in incubator column 26 as a result of the insulation afforded by the ground 27. As indicated above this will assist in minimizing the effect of any temperature changes that may occur to the pollution stream. A portion of the liquid pollution stream is transferred by pump 28 from the lower section 29 of reservoir cavity 24 and introduced into the lower end 30 of incubator column 26 through inlet pipe 31. The pumping action forces the pollution stream to flow upward through material 32 in incubator column 26 and then to exit through the upper section 33 of incubator column 26 via discharge pipe 34.

The material 32 utilized in incubator column 26 is preferably the same type material used in incubator column 2 described above. Also as in incubator column 2 there is formed a partially treated pollutant stream, an untreated portion of the pollutant stream, methane or other gases, sloughed anaerobes, as well as anaerobe excrement and sludge. These are then returned to the upper section 35 of the reservoir cavity 24. The methane or other gases are vented through the top wall 36 of closed tank 23 via pipe 36A to prevent any significant accumulation of gas in reservoir cavity 24, or transferred by conventional piping (not shown) to a scrubber or other treating equipment, and then preferably used as a fuel or sold. Although not illustrated, the anaerobic incubator column 2 could, if size permitted, be placed in reservoir cavity 23.

Figure 2:
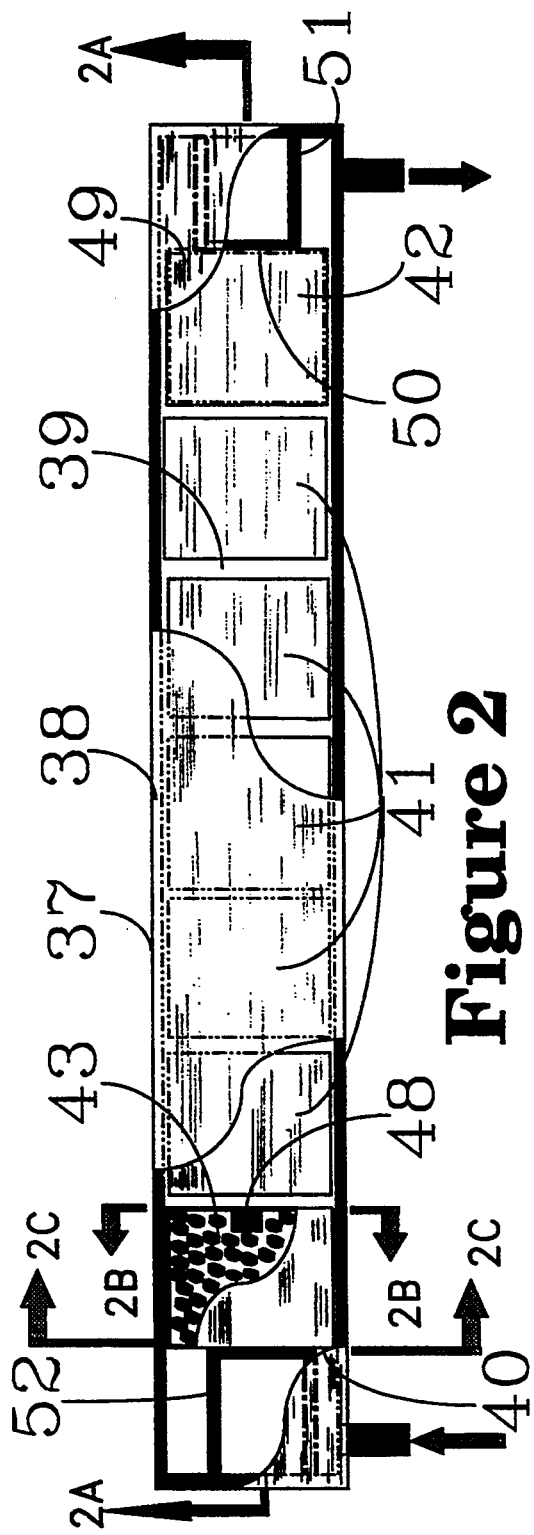
FIG. 2 is a three dimensional, cutaway view of a preferred embodiment of an anaerobic incubator column of this invention.
Figure 2A:
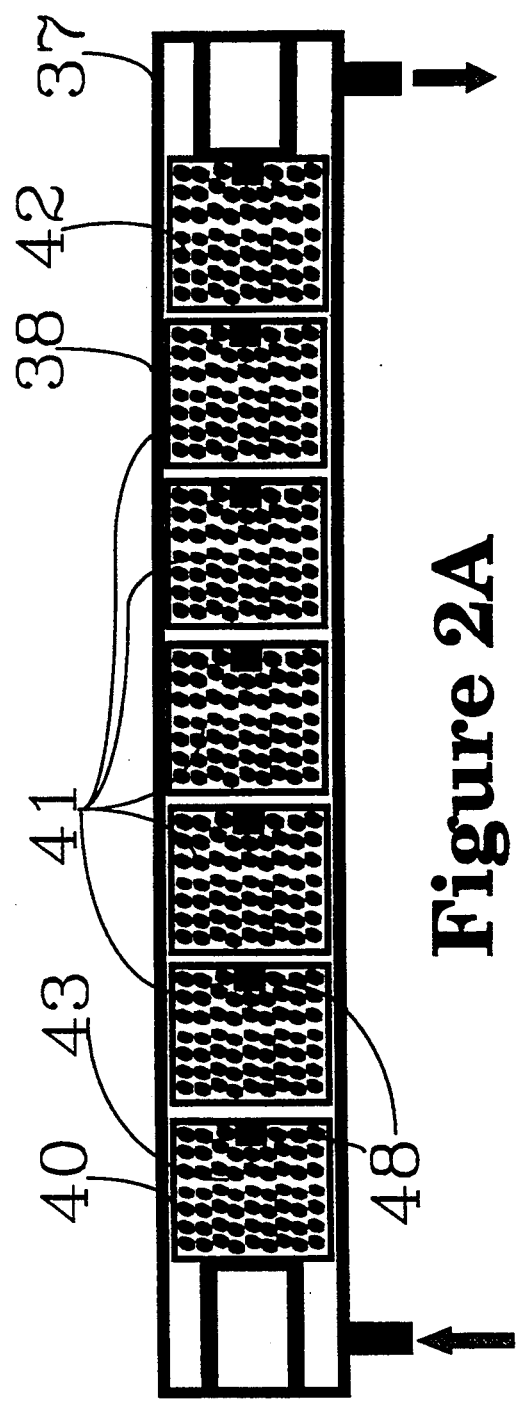
FIG. 2A is a cross-sectional view taken along lines A—A of FIG. 2.
Figure 2B:
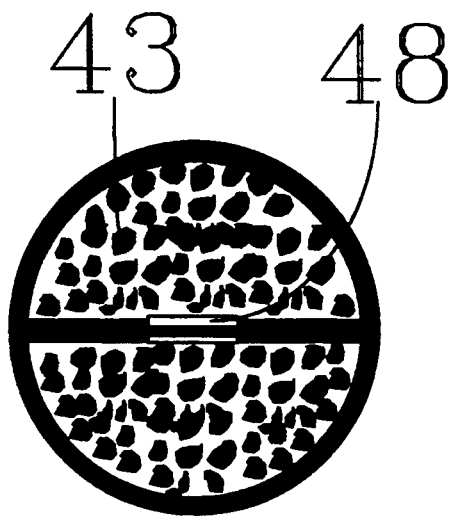
FIG. 2B is a view taken along lines B—B of FIG. 2 of the top of a preferred canister.
Figure 2C:
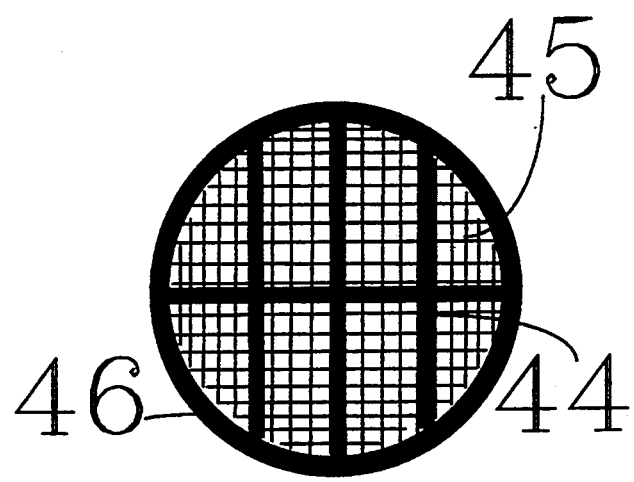
FIG. 2C is a view taken along lines C—C of FIG. 2 of the bottom of a preferred canister.
Figure 2D:
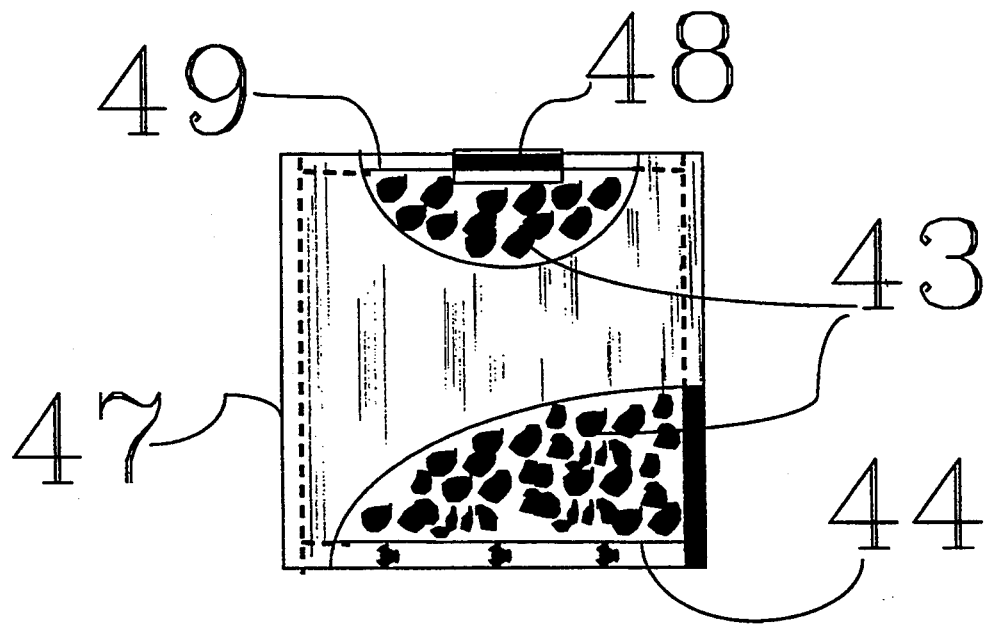
FIG. 2D is a three-dimensional cutaway view of a canister used in one embodiment of the incubator column of this invention.

Referring now to FIGS. 2 through 2D a preferred anaerobic incubator column 37 is illustrated comprising cylindrical container 38 having a central passageway 39 into which have been placed bottom canister 40, middle canisters 41, and top canister 42. Each canister 40-42 is filled with charged, porous particles 43 which are retained in canisters 40-42 by bottom screens 44 extending across the bottom openings 45 of canisters 40-42, respectively, and sitting on container shoulder 46 extending perpendicularly inward from container side wall 47. Each canister 40-42 also has a lifting handle assembly 48 fixed to the canister side wall 47 to which a cable (not shown) can be attached to lift the canisters out of the passageway 39 one at a time.

Top canister 42 is provided with a top screen 49 that is placed on top of the charged porous particles 43 placed in canister 42 and sized to fit across the top opening 50 of canister 42, and must be removed before canister 42 can be lifted from column 37. Top canister screen 49 is retained in place by the overlapping bracket 51. Bottom canister 40 sits on and is supported by bottom bracket 52 which is secured to container 38 by welding or fiberglassing bracket 52 to container 38. Any other conventional means could be used to attach lifting handle assembly 48 to top canister 42 and to secure top canister 42 and bottom canister 40. Such means could include threading both so that lifting handle 48 could be screwed onto top canister 42, providing conventional latching means, or other similar arrangements that permit the two to be detached from one another.

The mesh size of screens 44 and 49 is smaller than the mesh size of the surfaces of the charged, porous particles 43 to prevent them from passing through the screens. It is noted that any other conventional means which would not require canisters 40-42 or which would prevent the surfaces from being carried out of the canisters 40-42 or falling into the lower canisters 41-42 or bottom of the container 38 can be used. This would include appropriate sized mesh screening, use of conventional fluid counterflow devices, use of traps, etc.

EXPERIMENTAL TEST I

A pollution stream for a raw sugar mill processing plant containing undesirable levels of sugar and organic acid compounds flowed into a 3.5 acre foot pond having an average depth of approximately 7 feet. During the test period an unknown quantity of pollution from rain and runoff from bagasse piles located next to the pond was added to the existing pollution in the pond and little or none of the pollution stream flowed out of the pond.

Figure 7:
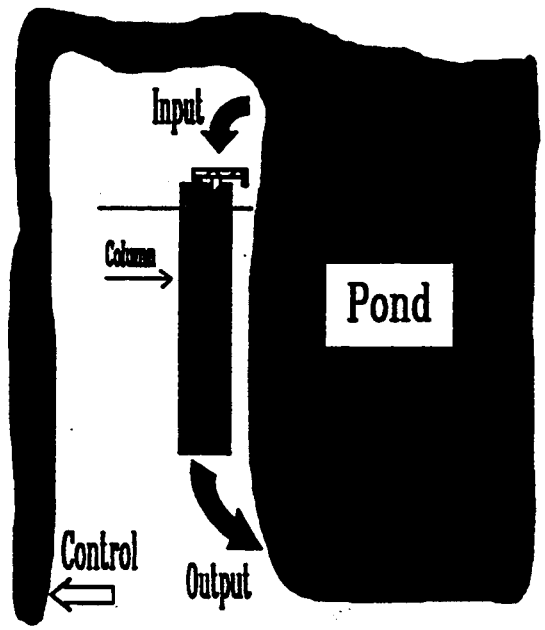
FIG. 7 is a top view of the pond bioreactor used in Experimental Test I.

The pond was provided with an L-shaped channel having an approximate length of 400 feet, a width of 15 feet, and a depth of 8 feet. The pond was approximately 200 feet by 100 feet by 7 feet in dimension and shaped as illustrated in FIG. 7. Samples of the pollution in the remote end of the channel were taken at different times during the 70 day test period. The COD level of each sample was measured and used as a measure of the reduction to the COD level resulting from natural biological action. This data is provided in graphical form in FIG. 3A as the Control COD.

Figure 3A:
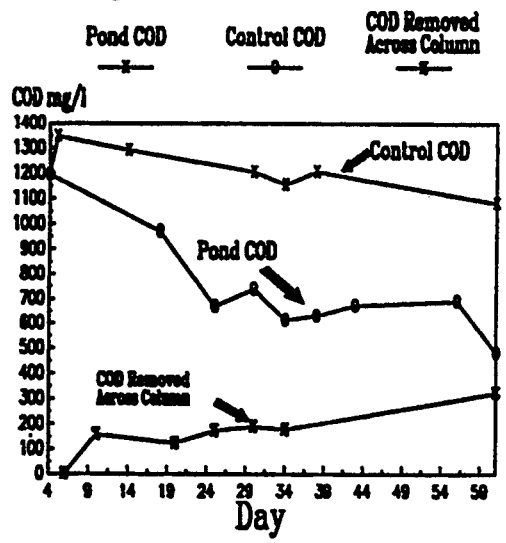
FIGS. 3A-3B are graphical representations of the data obtained in Experimental Test I illustrating the substantial improvement that the anaerobic incubator column had on the COD and pH levels in the raw sugar mill pollution pond.
Figure 3B:
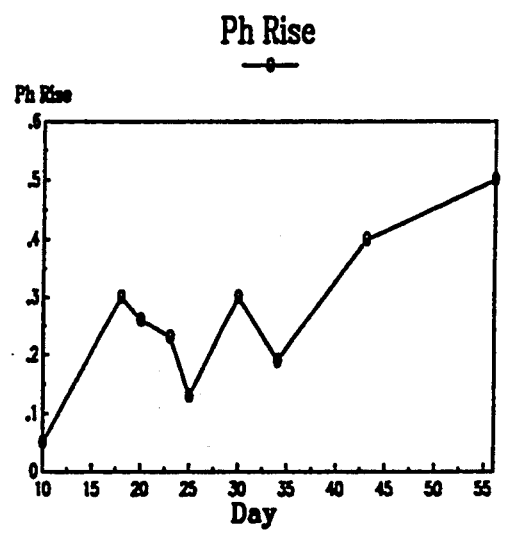

Placed near the main body of the pond was an anaerobic incubator column of this invention similar to that illustrated in FIG. 2. This column was approximately 170 inches long and had an interior diameter of approximately 23.43 inches. Placed in the interior of the column was a series of canisters such as illustrated in FIG. 2, each having an inside diameter of 22.25 inches and 14.70 inches high. In each canister was placed 4×10 mesh activated carbon which had been pre-saturated with the liquid pollution in the pond. When filled, the column contained approximately 809 pounds of activated carbon which weighed approximately 24 pounds per cubic foot. The liquid pollution stream from the pond was pumped using a 0.5 horsepower electric pump through the column at varying rates between 4 and 16 gallons per minute (gpm). A substantial portion of the flow from the pump was diverted back to the pond without flowing through the column because the pumping power of the pump approximated 70 gpm and only 4-16 gpm was being pumped through the column. After a period of adjustment to allow the proper amount of indigenous anaerobic microorganisms to incubate in the column, samples were drawn during the testing period at the inlet and outlet of the incubator column and analyzed for COD content. The results of these analyses is presented in the FIG. 3A graph as COD Removed Across the Column. These samples were also tested for their pH level. The results of these tests is presented in the FIG. 3B graph. FIGS. 3A-3B are graphical representations of the data obtained in Experimental Test I illustrating the COD reduction obtained in a raw sugar mill pollution pond utilizing an anaerobic incubator column of this invention, as well as the pH change occurring in the column.

The third set of samples were drawn during the test period directly from the pond at a position remote from the channel and the point where the incubator column output was returned to the pond, and analyzed for COD content. The results of these analyses is presented in the FIG. 3A graph as Pond COD.

The fourth set of samples were drawn during the test period directly from the channel at a position remote from the pond and the point where the incubator column output was returned to the pond, and analyzed for COD content. The results of these analyses is presented in the FIG. 3A graph on Control COD.

As the data clearly indicates the incubator column became consistently more efficient during the testing period and the Pond COD was substantially reduced over what would have been expected to occur during natural biological action (Control COD). In addition the trend showed that further reduction in the COD level of the pond would be expected as treatment continued despite the continual addition of new pollution into the pond. The data presented in FIG. 3B further indicates that the column was increasingly effective in reducing the acidity of the pollution stream.

EXPERIMENTAL TEST II

The wash from a shed housing alligators was pumped into a 8,000 gallon holding tank such as illustrated in FIG. 1C. The wash consisted of alligator urine and excrement, uneaten blood meal and other organic food materials, water, and bleach (chlorine containing compounds) used to wash out the alligator shed.

A separate control tank was not used during the test period; however, prior experience with the holding tank indicated that very little bioremediation was occurring in the tank. This remediation was estimated at 3.66 pounds per day.

The wash was transferred into the tank where it would be treated for approximately three days before overflowing the tank. Overflow occurs each time new wash (approximately 1200 gallons twice per day) is transferred to the tank. In the beginning of the testing period the COD levels in the tank exceeded 2,800 mg/l with 4 to 5 feet of sludge covering the bottom of the tank. The wash being transferred to the tank tested at COD levels in excess of 3400 mg/l on non-feeding shifts and over 6800 mg/l after feeding. Feeding occurred every other day on the evening shift. The COD of the wash varied with the amount the reptiles were fed and the amount of water used to wash their pens in the shed.

When the experiment was started, the tank held five days accumulation of wash as well as three months accumulation of sludge on the bottom. This sludge was uncharacterized but much of it was believed to be excrement and alligator feed that had settled to the bottom of the tank. The food was a high blood meal product having characteristics much like pollution from meat packing plants.

The pollution was pumped through the incubator column at varying rates between 5-15 gpm using a 0.5 horsepower electric pump. Less than 25% of the pumping capacity of the pump was used to pump the pollution stream through the incubator column and back into the tank. One liter samples were taken weekly at the input and output to the column, as well as from the feeding shed. These samples were analyzed for their COD and pH levels. The results from the COD analyses is set forth in the FIG. 4 graph. These results show that the increased bioremediation in the tank is 23 fold greater than the original bioremediation occurring in tank, and that the total bioremediation occurring in the tank and the incubator column is 53 fold greater than the original bioremediation occurring in the tank.

The incubator column used in this experiment was the same as the one used in Experimental Test I.

Figure 4A:
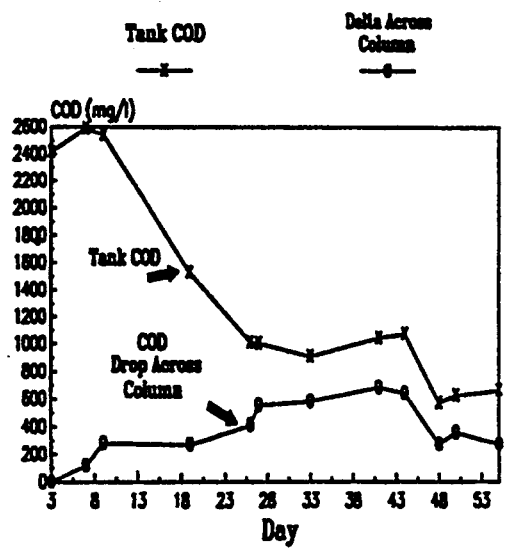
FIG. 4A and 4B are graphical representations of the data obtained in Experimental Test II illustrating the COD reduction obtained in an alligator farm pollution stream utilizing the anaerobic incubator column of this invention, as well as the remediation occurring in the tank prior to and after the installation of the incubator column, the remediation occurring in the incubator column, and combined remediation occurring in the incubator column and tank.
Figure 4B:
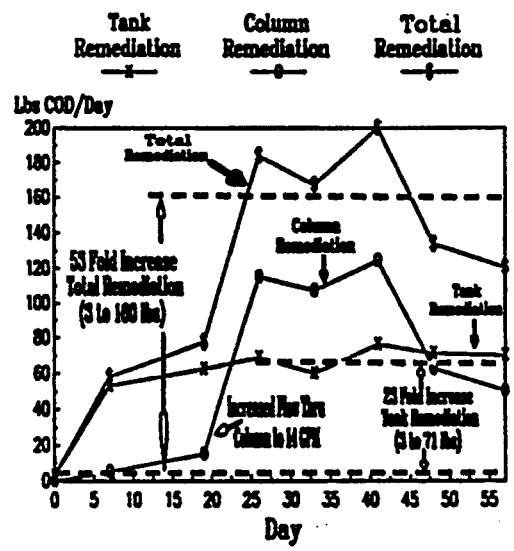
Figure 5A:
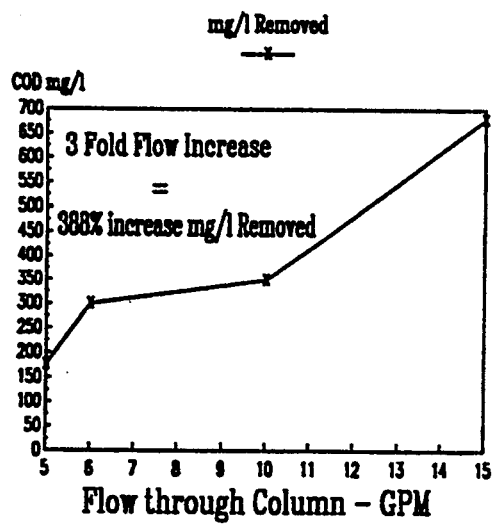
FIG. 5A is a graphical representation which shows the milligrams per liter of COD consumed in the anaerobic incubator column per gallon of column flow and shows that increasing the flow increases the milligrams of COD removed per liter.
Figure 5B:
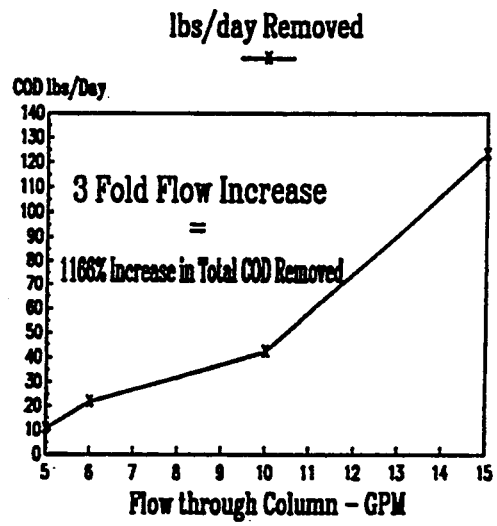
FIG. 5B shows the pounds of COD per day consumed in the anaerobic incubator column per gallon of column flow and shows that increasing the flow increases the pounds of COD removed per day.

As the FIG. 4 graph clearly illustrates, once the initial accumulated sludge was remediated, the column was very effective in reducing the Tank COD levels and that over time the column was increasing in efficiency. FIGS. 5A & B show the effects of flow rate (expressed in gallons per minute) on the amount of BOD removed. More particularly FIG. 5A shows that increasing the flow rate from 5 gpm to 15 gpm increases the milligrams of COD removed per liter of flow by 388%. From FIG. 5B it is seen that increasing the flow rate from 5 gpm to 15 gpm increased the pounds of COD removed per day by 1166%.

Figure 6:
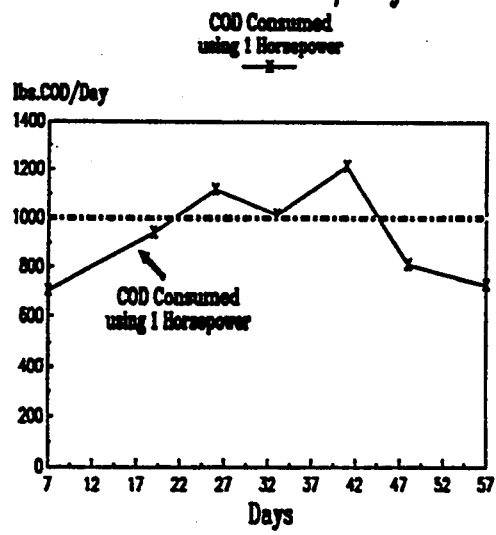
FIG. 6 shows the COD consumed per day by a bioreactor and an attached anaerobic incubator column showing an average of 1000 pounds of COD per day being consumed by the bioreactor and the incubator column combined per horsepower used to circulate the flow at 15 gallons/minute from the bioreactor through the incubator column and back into the bioreactor.

FIG. 6 illustrates the pounds of COD consumed per day per horsepower used to circulate the flow through the column and back to the tank. More particularly at a flow rate of 15 gpm an average of 1000 pounds of COD per day was consumed per horsepower used to circulate the liquid pollution stream through the incubator column.

There are of course other alternate embodiments which are obvious from the foregoing descriptions of the invention which are intended to be included within the scope of the invention as defined by the following claims.

What we claim is:

1. A process to increase the anaerobic remediation rate of a liquid pollution stream which comprises:
   (a) introducing said stream into a bioreactor;
   (b) flowing a portion of said stream from said bioreactor through a passageway, said passageway having a dissolved oxygen level sufficiently reduced to support anaerobic microorganisms, said passageway containing material on whose surface anaerobic microorganisms can become attached or immobilized, at a flow rate to make available sufficient amounts of pollutants from said stream to allow more anaerobic microorganisms to be reproduced than there are available attachment or immobilization sites and to cause at least a portion of any attached or immobilized microorganisms from said surface to slough from said surface; and
   (c) recirculating to said bioreactor said portion of said stream that has flowed through said passageway and said portion of said attached or immobilized microorganisms sloughed from said surface.

2. A process according to claim 1 wherein said material is porous.

3. A process according to claim 2 wherein said material is activated carbon having a 4×10 mesh size.

4. A process according to claim 1, 2 or 3 wherein said material is charged.

5. A process according to claim 4 wherein said stream is either positively or negatively charged and said material is oppositely charged from said stream.

6. A process according to claim 1 wherein said flow rate is 0.1–12.0 times the volume of said passageway per hour.

7. A process according to claim 1 wherein after a substantial portion of said surface is saturated by said attached or immobilized microorganisms, said flow rate is sufficient to cause at least $10^5$ cfu of said attached or immobilized microorganism per milliliter of said portion of said stream flowing through said passageway to slough from said surface.

8. A process according to claim 1 wherein after a substantial portion of said surface is saturated by said attached or immobilized microorganisms, said flow rate is sufficient to cause $10^6$–$10^8$ cfu of said attached or immobilized microorganism per milliliter of said portion of said stream flowing through said passageway to slough from said surface.

9. A process according to claims 7 or 8 wherein said substantial portion of said surface is saturated if there is at least $10^{10}$ cfu of attached or immobilized microorganisms per square millimeter of said surface.

10. A process according to claims 7 or 8 wherein said flow rate is sufficient to create an attached or immobilized population density about said surface of at least $10^{10}$ cfu per square millimeter of said surface.

11. A process according to claim 10 wherein said attached or immobilized population density is approximately $10^{12}$ cfu per square millimeter of said surface.

12. A process according to claim 1 wherein said flow rate is adjusted to a rate sufficient to create the largest BOD reduction within said portion of said stream flowing through said passageway while said portion of said stream is within said passageway.

* * * * *